United States Patent
Aga et al.

(10) Patent No.: US 11,072,537 B2
(45) Date of Patent: Jul. 27, 2021

(54) FERRITE POWDER, RESIN COMPOSITION, AND MOLDED ARTICLE

(71) Applicant: Powdertech Co., Ltd., Kashiwa (JP)

(72) Inventors: Koji Aga, Kashiwa (JP); Tetsuya Igarashi, Kashiwa (JP)

(73) Assignee: Powdertech Co., Ltd., Kashiwa (JP)

( * ) Notice: Subject to any disclaimer, the term of this patent is extended or adjusted under 35 U.S.C. 154(b) by 205 days.

(21) Appl. No.: 16/095,710

(22) PCT Filed: Apr. 11, 2017

(86) PCT No.: PCT/JP2017/014857
§ 371 (c)(1),
(2) Date: Oct. 23, 2018

(87) PCT Pub. No.: WO2017/191737
PCT Pub. Date: Nov. 9, 2017

(65) Prior Publication Data
US 2019/0135653 A1    May 9, 2019

(30) Foreign Application Priority Data
May 6, 2016  (JP) .............................. JP2016-093450

(51) Int. Cl.
| | | |
|---|---|---|
| C01G 49/00 | (2006.01) | |
| H01F 1/20 | (2006.01) | |
| C01G 49/02 | (2006.01) | |
| A47J 36/02 | (2006.01) | |
| C08K 3/22 | (2006.01) | |
| C08L 101/00 | (2006.01) | |
| H01F 1/37 | (2006.01) | |
| H05B 6/74 | (2006.01) | |
| C08K 7/16 | (2006.01) | |

(52) U.S. Cl.
CPC .............. *C01G 49/02* (2013.01); *A47J 36/02* (2013.01); *C01G 49/00* (2013.01); *C08K 3/22* (2013.01); *C08L 101/00* (2013.01); *H01F 1/37* (2013.01); *H05B 6/74* (2013.01); *C08K 7/16* (2013.01); *C08K 2003/2265* (2013.01)

(58) Field of Classification Search
CPC .... C01G 49/0072; C01G 49/04; C01G 49/06; H01F 1/20; H01F 1/22; H01F 1/36
See application file for complete search history.

(56) References Cited

U.S. PATENT DOCUMENTS

| | | | |
|---|---|---|---|
| 4,282,302 A | | 8/1981 | Makino et al. |
| 4,626,371 A | * | 12/1986 | Ikenaga ................... H01F 1/37 252/62.54 |
| 2017/0301443 A1 | | 10/2017 | Aga et al. |

FOREIGN PATENT DOCUMENTS

| | | |
|---|---|---|
| CN | 1826272 A | 8/2006 |
| JP | 61-291421 A | 12/1986 |
| JP | 10-326706 A | 12/1998 |
| JP | 2008-512655 A | 4/2008 |
| JP | 2009-120974 A | 6/2009 |
| JP | 2013-25204 A | 2/2013 |
| JP | 2016025288 A | 2/2016 |
| JP | 2018120921 A | 8/2018 |
| WO | 2005007532 A1 | 1/2005 |
| WO | 2006026823 A1 | 3/2006 |
| WO | 2016043051 A1 | 9/2015 |

OTHER PUBLICATIONS

Extended European Search Report from corresponding European Application No. 17792670.6, dated Oct. 31, 2019, 8 pages.
Lio et al., "Submicron Magnetic Particles of Mn0.25Fe2.75O4 and Their Magnetorheological Charateristics," IEEE Transactions on Magnetics, pp. 3406-3409, vol. 49, No. 7, Jul. 2013.

* cited by examiner

*Primary Examiner* — Matthew E. Hoban
(74) *Attorney, Agent, or Firm* — Tucker Ellis LLP; Heather M. Barnes

(57) ABSTRACT

Ferrite powder of the present invention is ferrite powder detectable with a metal detector, comprising: soft ferrite particles containing Mn of 3.5 mass % or more and 20.0 mass % or less and Fe of 50.0 mass % or more and 70.0 mass % or less. It is preferable that a volume average particle diameter of the particles constituting the ferrite powder is 0.1 μm or more and 100 μm or less. It is preferable that magnetization by a VSM measurement when magnetic field of 5 K·1000/4πA/m is applied is 85 A·m²/kg or more and 98 A·m²/kg or less.

12 Claims, No Drawings

FERRITE POWDER, RESIN COMPOSITION, AND MOLDED ARTICLE

CROSS-REFERENCE TO RELATED APPLICATIONS

This application is a continuation of, and claims priority to PCT Application No. PCT/JP2017/045857, entitled FERRITE POWDER, RESIN COMPOSITION, AND MOLDED ARTICLE, filed on Apr. 11, 2017, which claims priority to a Japanese patent application, Japan Application No. JP2016-093450, entitled FERRITE POWDER, RESIN COMPOSITION AND MOLDED ARTICLE, filed May 6, 2016, all of which are incorporated herein by reference.

TECHNICAL FIELD

The present invention relates to ferrite powder, a resin composition and a molded body.

RELATED ART

For example, at a field of manufacturing a food, there is a problem of contamination of foreign matters. When the problem of the contamination of foreign matters occurs, it becomes a big social problem, thereby giving a great deal of uneasiness to consumers as well as a great damage to food manufacturers, processors and the like.

In order to prevent the contamination of foreign materials, a metal detector is introduced, and opportunities to conduct a test on products before shipment are increasing.

However, since the metal detector cannot detect ordinary plastic materials and the like, it is impossible to detect foreign matters derived from a tool such as a packaging material used at the time of manufacturing even if the foreign matters are mixed and/or contaminated.

For the purpose of solving such a problem, a working glove including a metal detection material constituted of a metal such as iron has been proposed (see Patent Document 1).

However, in such a technology, even when it is mixed and/or contaminated as the foreign matters, there is a case in which it is not detected by the metal detector. In addition, there is a case in which the metal may not be detected with the metal detector by a change over time due to a chemical reaction such as an oxidation reaction.

PRIOR ART DOCUMENTS

Patent Documents

Patent document 1: JP 2009-120974 A

SUMMARY OF THE INVENTION

Problems to be Solved by the Invention

An object of the present invention is to provide a molded body which is capable of stably detecting with a metal detector and to provide ferrite powder and a resin composition which are capable of suitably using for producing the molded body.

Means for Solving the Problems

Such an object is achieved by the following present inventions.

Ferrite powder of the present invention is ferrite powder detectable with a metal detector, comprising: soft ferrite particles containing Mn of 3.5 mass % or more and 20.0 mass % or less and Fe of 50.0 mass % or more and 70.0 mass % or less.

In the ferrite powder of the present invention, it is preferred that a volume average particle diameter of the particles constituting the ferrite powder is 0.1 μm or more and 100 μm or less.

In the ferrite powder of the present invention, it is also preferred that magnetization by a VSM measurement when a magnetic field of 5 K·1000/4πA/m is applied is 85 A·m²/kg or more and 98 A·m²/kg or less.

A resin composition of the present invention, comprising: the ferrite powder of the present invention; and a resin material.

In the resin composition of the present invention, it is preferred that the ferrite powder is dispersedly present in the resin material.

In the resin composition of the present invention, it is also preferred that a content rate of the ferrite powder in the resin composition is 5.0 mass % or more and 90 mass % or less.

In the resin composition of the present invention, it is also preferred that the resin material includes one kind or more kinds selected from the group consisting of polyethylene, polypropylene, polyvinyl chloride, polyvinylidene chloride, polyvinyl alcohol (PVA), a fluorine based resin, silicone rubber, butadiene rubber, a thermoplastic elastomer, an epoxy resin and a silicone resin.

A molded body of the present invention has a portion formed by using the resin composition of the present invention.

In the molded body of the present invention, it is preferred that a content rate of the ferrite powder is 2.0 mass % or more and 20 mass % or less.

In the molded body of the present invention, it is also preferred that the molded body is used in a field for manufacturing, processing and packaging of a food.

In the molded body of the present invention, it is also preferred that the molded body is used for a part or all of a cooking utensil, a food preparation tool or a food packaging member.

In the molded body of the present invention, it is also preferred that the molded body contains the ferrite powder in a region within 1.0 mm in a thickness direction from a surface thereof.

Effect of the Invention

According to the present invention, it is possible to provide a molded body which is capable of stably detecting with a metal detector and to provide ferrite powder and a resin composition which are capable of suitably using for producing the molded body.

DETAILED DESCRIPTION OF THE PREFERRED EMBODIMENTS

Hereinbelow, description will be made on preferred embodiments according to the present invention in detail.

<<Ferrite Powder>>

First, description will be made on ferrite powder according to the present invention.

The ferrite powder of the present invention is characterized by containing a plurality of soft ferrite particles containing Mn of 3.5 mass % or more and 20.0 mass % or less and Fe of 50.0 mass % or more and 70.0 mass % or less.

This makes it possible for the metal detector to detect the ferrite powder or the molded body containing the ferrite powder with ease. Therefore, for example, when the ferrite powder of the present invention or at least a part of the molded body containing the ferrite powder is erroneously contaminated in products such as a food product or the like, they can be reliably detected by the metal detector, so that it is possible to effectively prevent such products from distributing outside.

Further, the ferrite powder as described above is constituted of an oxide as a main component, environments, it is excellent in the stability of the detection by the metal detector. In addition, the ferrite powder as described above has also excellent safety to the human body.

On the other hand, in the case where the ferrite powder does not satisfy the conditions of the above-mentioned composition, the excellent effect as described above cannot be obtained.

For example, if a content rate of Mn in the soft ferrite particles is less than 3.5 mass %, an amount of Fe becomes excessive, so that the oxidation reaction tends to proceed at the time of producing the resin composition (particularly, at the time of mixing and kneading by heating) and at the time of producing the molded body (particularly, at the time of molding by heating). As a result, magnetization of the finally obtained molded body is lowered. Consequently, it becomes difficult to detect the ferrite powder or the molded body containing the ferrite powder by the metal detector.

Further, if the content rate of Mn in the soft ferrite particles exceeds 20.0 mass %, oxidation proceeds when a treatment such as milling is performed after the sintering, so that the magnetization becomes low. As a result, it becomes difficult to detect the ferrite powder or the molded body containing the ferrite powder by the metal detector.

Further, if a content rate of Fe in the soft ferrite particles is less than 50.0 mass %, it means that an amount of Mn is increased, and thus the oxidation proceeds when the treatment such as the milling is performed after the sintering, so that the magnetization becomes low. As a result, it becomes difficult to detect the ferrite powder or the molded body containing the ferrite powder by the metal detector.

Further, if the content rate of Fe in the soft ferrite particles exceeds 70.0 mass %, the amount of Fe becomes excessive, so that the oxidation reaction tends to proceed with ease at the time of producing the resin composition (particularly, at the time of mixing and kneading by heating) and at the time of producing the molded body (particularly, at the time of molding by heating). As a result, the magnetization of the finally obtained molded body is lowered. Consequently, it becomes difficult to detect the ferrite powder or the molded body containing the ferrite powder by the metal detector. Furthermore, in the case where Mn is not contained, resistance of the ferrite powder becomes too low, to thereby be locally heated at the time of heating by microwaves, so that there is a possibility that a resin molded product containing the ferrite powder is deformed.

Also, in the case where other ferrite particles are used in place of the soft ferrite particles containing Mn and Fe as described above, the excellent effect as described above cannot be obtained.

For example, in the case where particles constituted of Ni—Zn—Cu based ferrite are used in place of the soft ferrite particles containing Mn and Fe as described above, a Curie point of the ferrite powder is lowered and it becomes difficult to stably detect the ferrite powder by the metal detector in the usage environment at the high temperature.

In addition, in the case where hard ferrite particles are used in place of the soft ferrite particles as described above, by magnetization due to a magnetic field of the usage environment or the storage environment of the resin molded body containing the ferrite powder, for example, by the magnetization due to the influence of a magnetic field of a motor, occur problems that the resin molded body is adsorbed to other metal members.

As described above, the content rate of Mn in the soft ferrite particles may be 3.5 mass % or more and 20.0 mass % or less, but preferably 5.0 mass % or more and 19.0 mass % or less, and more preferably 6.4 mass % or more and 18.0 mass % or less.

As a result, the effect as described above is more remarkably exhibited.

Further, the content rate of Fe in the soft ferrite particles may be 50.0 mass % or more and 70.0 mass % or less, but preferably 51.0 mass % or more and 66.0 mass % or less, and more preferably 52.0 mass % or more and 65.0 mass % or less.

As a result, the effect as described above is more remarkably exhibited.

A content of each metal element (Fe, Mn, etc.) constituting the ferrite particles can be measured as follows.

First, ferrite particles: 0.2 g are weighed, and the ferrite particles are mixed to a mixed solvent of pure water: 60 ml, 1 N hydrochloric acid: 20 ml and 1 N nitric acid: 20 ml to obtain a mixture. Thereafter, the mixture is heated to obtain a solution in which the ferrite particles are completely dissolved. Then, by measuring the solution using an ICP analyzer (for example, ICPS-1000 IV manufactured by Shimadzu Corporation), the content of the metal element can be obtained.

The soft ferrite constituting the soft ferrite particles may contain a component (element) other than Fe, Mn and O. Examples of such a component include Mg, Ti, Si, Cl, Ca, Al and the like.

However, a content rate of the component (element) other than Fe, Mn and O contained in the soft ferrite constituting the soft ferrite particles is preferably 1.0 mass % or less.

In addition, the soft ferrite particles may contain a component other than the soft ferrite.

However, a content rate of the component other than the soft ferrite contained in the soft ferrite particles is preferably 1.0 mass % or less.

A volume average particle diameter of the particles constituting the ferrite powder is not particularly limited, but is preferably 0.1 μm or more and 100 μm or less, and more preferably 0.2 μm or more and 80 μm or less.

This makes it possible to further improve dispersibility of the ferrite powder to the resin material, and it is possible to perform production of the resin composition containing the ferrite powder and the resin material more suitably. In addition, it is possible to further improve strength, surface property and reliability of the molded body produced by using the resin composition. Further, it is possible to more stably produce the molded body using the resin composition. Furthermore, it is possible to more suitably adjust a color tone of the molded body.

On the other hand, if the volume average particle diameter of the particles constituting the ferrite powder is less than the lower limit value noted above, depending on the amount of the ferrite powder used for producing the resin composition, it takes time to disperse the ferrite powder in the resin material or an aggregate is dispersed as it is at the time of producing the resin composition as described later. Therefore, it is not preferable. In addition, a coloring power of ferrite becomes strong by reducing a particle size, and it tends to be a dull color when adding a color other than black, gray or brown. Therefore, it is not preferable.

Further, if the volume average particle diameter of the particles constituting the ferrite powder exceeds the upper limit value noted above, depending on the amount of the ferrite powder used for producing the resin composition, although depending on a shape, size and the like of the molded body produced using the resin composition, there is a possibility that the strength and the surface property (finish) of the molded body when the molded body is formed decrease. Therefore, it is not preferable. Further, for example, when an injection molding method is adopted as a method of producing the molded body, there is a possibility that the resin composition clogs a path of injection. Therefore, it is not preferable.

Furthermore, the volume average particle diameter of the particles constituting the ferrite powder is selected depending on, for example, the shape, size and the like of the molded body produced using the ferrite powder. More specifically, in the case where the ferrite powder is used for producing the molded body in the form of a film or sheet, it is preferred that the volume average particle diameter of the particles constituting the ferrite powder is 10 μm or less.

Further, in the production of the molded body, in the case where it is colored using a filler other than the ferrite powder, it is preferred that the volume average particle diameter of the ferrite powder is 5 μm or more.

This makes it possible to minimize the influence of the tint of the ferrite powder at the time of coloring.

The volume average particle diameter can be obtained, for example, by the following measurement. That is, first, the ferrite powder: 10 g as a sample and water: 80 ml are placed in a 100 ml beaker and 2 to 3 drops of a dispersant (sodium hexamethaphosphate) are added thereto. Next, dispersion is performed using an ultrasonic homogenizer (for example, UH-150 type manufactured by SMT Co. LTD.). In the case where the UH-150 type manufactured by SMT Co. LTD. is used as the ultrasonic homogenizer, for example, an output level 4 is set and the dispersion may be performed for 20 seconds. Thereafter, foam formed on a surface of the beaker is removed, and then it is introduced into a Microtrac particle size analyzer (for example, Model 9320-X100 manufactured by Nikkiso Co., Ltd.) to measure.

Furthermore, the ferrite powder of the present invention may contain other particles in addition to the soft ferrite particles as described above. For example, it may contain soft ferrite particles not satisfying the conditions as described above and hard ferrite particles in addition to the soft ferrite particles as described above.

The particles constituting the ferrite powder may be subjected to a surface treatment.

Examples of a surface treatment agent used for the surface treatment of the particles include a silane coupling agent, a phosphoric acid based compound, a carboxylic acid, a fluorine based compound, and the like.

Particularly, if the particles constituting the ferrite powder are subjected to the surface treatment with the silane coupling agent, the aggregation of the particles can be more effectively prevented, so that it is possible to more improve flowability and ease of handling of the ferrite powder or the resin composition containing the ferrite powder. Further, it is possible to further improve the dispersibility of the particles in the molded body in the resin composition.

As the silane coupling agent, for example, a silane compound having a silyl group and a hydrocarbon group can be used. In particular, it is preferred that the silane coupling agent has an alkyl group having a carbon number of 8 or more and 10 or less as the alkyl group.

This makes it possible to further effectively prevent the aggregation of the soft ferrite particles and further improve the flowability and the ease of handling of the ferrite powder or the resin composition containing the ferrite powder. Furthermore, it is possible to further improve the dispersibility of the soft ferrite particles in the molded body in the resin composition.

Examples of the phosphoric acid based compound include lauryl phosphate ester, lauryl-2 phosphate ester, steareth-2 phosphate, phosphate ester of 2-(perfluorohexyl) ethylphosphonic acid, and the like.

As the carboxylic acid, for example, a compound (fatty acid) having a hydrocarbon group and a carboxyl group can be used. Specific examples of such a compound include decanoic acid, tetradecanoic acid, octadecanoic acid, cis-9-octadecenoic acid and the like.

Examples of the fluorine based compound include the silane coupling agent as described above, a phosphoric acid based compound, a compound having a structure in which at least a part of hydrogen atoms of the carboxylic acid is substituted with fluorine atoms (fluorine based silane compound, fluorine based phosphate compound, fluorine-substituted fatty acid), and the like.

Magnetization of the ferrite powder by a VSM measurement when a magnetic field of 5 K·1000/4πA/m is applied is preferably 85 A·m$^2$/kg or more and 98 A·m$^2$/kg or less, and more preferably 87 A·m$^2$/kg or more and 97 A·m$^2$/kg or less.

This makes it possible to more improve toughness, the strength and the like of the molded body while further improving easiness of the detection of the molded body produced using the ferrite powder by the metal detector. It is also advantageous in suppressing a production cost of the molded body.

On the other hand, if the magnetization is less than the lower limit value noted above, unless a content rate of the ferrite powder in the molded body produced using the ferrite powder is increased, the easiness of the detection of the molded body by the metal detector becomes insufficient. In addition, if the content rate of the ferrite powder in the molded body is increased in order to improve the easiness of the detection by the metal detector, the toughness and the strength of the molded body are decreased with ease.

Furthermore, if the magnetization exceeds the upper limit value noted above, in order to realize magnetic properties, adjustment of the composition of the ferrite powder becomes complicated, and it becomes difficult to stably obtain superior properties. Further, even if the magnetization exceeds the upper limit value noted above, practically it is not expected to further improve the easiness of the detection of the molded body containing the ferrite powder or the ferrite powder by the metal detector.

Residual magnetization of the ferrite powder by the VSM measurement when the magnetic field of 5 K·1000/4πA/m is applied is preferably 4.5 A·m$^2$/kg or more and 40 A·m$^2$/kg or less, and more preferably 5.0 A·m$^2$/kg or more and 37 A·m$^2$/kg or less.

This makes it possible to more improve the toughness, the strength and the like of the molded body while further improving the easiness of the detection of the molded body produced using the ferrite powder by the metal detector. It is also advantageous in suppressing the production cost of the molded body.

On the other hand, if the residual magnetization is less than the lower limit value noted above, unless the content rate of the ferrite powder in the molded body produced using the ferrite powder is increased, the easiness of the detection by the metal detector becomes insufficient. In addition, if the content rate of the ferrite powder in the molded body is increased in order to improve the easiness of the detection by the metal detector, the toughness and the strength of the molded body are decreased with ease.

Furthermore, if the residual magnetization exceeds the upper limit value noted above, in order to realize the magnetic properties, the adjustment of the composition of the ferrite powder becomes complicated, and it becomes difficult to stably obtain the superior properties. Further, even if the residual magnetization exceeds the upper limit value noted above, practically it is not expected to further improve the easiness of the detection of the molded body containing the ferrite powder or the ferrite powder by the metal detector.

Coercive force of the ferrite powder by the VSM measurement when the magnetic field of 5 K·1000/4πA/m is applied is preferably 550 A/m or more and 6500 A/m or less, and more preferably 600 A/m or more and 5300 A/m or less.

This makes it possible to more improve the easiness of the detection of the molded body produced using the ferrite powder by the metal detector. It is also possible to suppress the production cost of the molded body.

On the other hand, if the coercive force is less than the lower limit value noted above, in the case where the molded body produced by using the ferrite powder of the present invention is magnetized, sufficient magnetization cannot be obtained, and there is a possibility that the easiness of the detection of the molded body by the metal detector is lowered. Therefore, it is not preferable.

Further, if the coercive force exceeds the upper limit value noted above, in order to realize the magnetic properties, the adjustment of the composition of the ferrite powder becomes complicated, and it becomes difficult to stably obtain the superior properties. Further, even if the coercive force exceeds the upper limit value noted above, practically it is not expected to further improve the easiness of the detection of the molded body containing the ferrite powder or the ferrite powder by the metal detector.

The above magnetic properties, for example, can be obtained as follows. That is, first, a cell with an inner diameter of 5 mm and a height of 2 mm is filled with the ferrite powder and set in a vibration sample type magnetic measurement device. Next, an applied magnetic field is added and swept by 5 K·1000/4π·A/m. Next, the applied magnetic field is decreased to create a hysteresis curve. The magnetization (saturation magnetization), the residual magnetization and the coercive force can be obtained from the data of this curve. As the vibration sample type magnetic measurement device, for example, VSM-C7-10A (manufactured by TOEI INDUSTRY CO., LTD.) or the like can be used.

Further, a Curie temperature (Curie point) of the ferrite powder is preferably 400° C. or more, and more preferably 450° C. or more.

This makes it possible to further improve heat resistance of the ferrite powder, the resin composition containing the ferrite powder, and the molded body produced using them. Even when exposed to a higher temperature, it is possible to sufficiently maintain the easiness of the detection by the metal detector. The Curie temperature can be obtained by the measurement based on JIS C 2560-1.

The ferrite powder of the present invention may be produced by any method, but can be suitably produced by, for example, the method as described below.

That is, first, at least one of $MnCO_3$ and $Mn_3O_4$ as the raw material and $Fe_2O_3$ are mixed. The mixing of the raw material may be carried out by any one of a wet mixing and a dry mixing. The mixing of the raw material is carried out, for example, with a Henschel mixer or a ball mill.

The obtained mixture is calcined to obtain a calcined material.

The calcination conditions are not particularly limited, but it can be suitably carried out, for example, at a temperature: 800° C. or more and 1200° C. or less in the atmosphere.

Thereafter, the calcined material is milled. The milling of the calcined material can be carried out by using, for example, a rod mill, a ball mill or the like.

A composition containing water, a binder such as polyvinyl alcohol (PVA), and a dispersant other than a milled product of the calcined material is prepared, and the composition is sprayed and dried to obtain granulated powder.

The composition may be prepared, for example, by adding water, the binder such as the polyvinyl alcohol (PVA) and the dispersant to a coarsely milled product of the calcined material and subjecting to a treatment of fine milling (wet milling).

Thereafter, by sintering the granulated powder, the ferrite powder can be obtained.

The sintering conditions are not particularly limited, but for example, it can be suitably carried out, for example, at a temperature: 1000° C. or more and 1300° C. or less in the atmosphere.

In the case where the ferrite powder contains the other particles in addition to the soft ferrite particles as described above, it is possible to obtain intended ferrite powder by mixing the powder containing the plurality of soft ferrite particles obtained as described above and the other particles.

<<Resin Composition>>

Next, description will be made on the resin composition of the present invention.

The resin composition of the present invention contains the ferrite powder of the present invention as described above and a resin material.

This makes it possible to provide the resin composition that can be suitably used for producing the molded body having excellent easiness of the detection and excellent stability of the detection by the metal detector.

In the resin composition of the present invention, the ferrite powder may be contained in any form, but is preferably dispersed in the resin material.

This makes it possible to further improve the ease of handling of the resin composition and carry out the forming of the molded body described later more reliably. Further, it is possible to effectively prevent the occurrence of unintentional variation of the content rate of ferrite powder in each part of the molded body, and more improve the reliability of the detection of the molded body containing the ferrite powder by the metal detector.

A content rate of the ferrite powder in the resin composition is not particularly limited, but is preferably 5.0 mass % or more and 90 mass % or less, and more preferably 7.0 mass % or more and 88 mass % or less.

This makes it possible to further improve the moldability of the molded body and to further improve the easiness of the detection and the stability of the detection of the molded body by the metal detector, while enabling the toughness, the strength, the reliability and the like of the molded body to be improved.

On the other hand, if the content rate of the ferrite powder in the resin composition is less than the lower limit value noted above, depending on the composition of the soft ferrite particles or the like, there is a possibility that the easiness of the detection and the stability of the detection of the molded body by the metal detector become insufficient.

Further, if the content rate of the ferrite powder in the resin composition exceeds the upper limit value noted above, there is a possibility that the moldability of the molded body decreases as well as the toughness, the strength, the reliability and the like of the molded body decrease.

Examples of the resin material contained in the resin composition include various kinds of thermoplastic resins, various kinds of curable resins and the like.

More specifically, examples of such a resin material include: polyolefin such as polyethylene, polypropylene, poly-(4-methylpentene-1), an ethylene-propylene copolymer, cyclic polyolefin and the like; modified polyolefin; polystyrene; a butadiene-styrene copolymer; an acrylonitrile-butadiene-styrene copolymer (ABS resin); an acrylonitrile-styrene copolymer (AS resin); polyvinyl chloride; polyvinylidene chloride; an ethylene-vinyl acetate copolymer (EVA); polyamide (e.g.: nylon 6, nylon 46, nylon 66, nylon 610, nylon 612, nylon 11, nylon 12, nylon 6-12, nylon 6-66); polyimide; polyamideimide; an acrylic based resin such as polymethyl methacrylate; polycarbonate (PC); an ionomer; polyvinyl alcohol (PVA); an ethylene-vinyl alcohol copolymer (EVOH); polyester such as polyethylene terephthalate (PET), polybutylene terephthalate (PBT), polycyclohexylene dimethylene terephthalate (PCT), polyarylate, aromatic polyester (liquid crystal polymer) and the like; polyether; polyacetal (POM); polyphenylene oxide; modified polyphenylene oxide; polyether ketone (PEK); polyether ether ketone (PEEK); polyether imide; polysulfone; polyether sulfone; polyphenylene sulfide; a fluorine based resin such as polytetrafluoroethylene, polyvinylidene fluoride and the like; a rubber material such as silicone rubber, isoprene rubber, butadiene rubber, nitrile rubber, natural rubber and the like; various kinds of thermoplastic elastomers such as a styrene type elastomer, a polyolefin type elastomer, a polyvinyl chloride type elastomer, a polyurethane type elastomer, a polyester type elastomer, a polyamide type elastomer, a polybutadiene type elastomer, a trans polyisoprene type elastomer, a fluoro rubber type elastomer, a chlorinated polyethylene type elastomer and the like; an epoxy resin; a phenol resin; an urea resin; a melamine resin; unsaturated polyester; a silicone resin; polyurethane and the like; or a copolymer, a blend and a polymer alloy mainly containing these; and the like. They can be used singly or in combination of two or more of them.

Among them, it is preferred that the resin material contained in the resin composition contains one or more kinds selected from the group consisting of the polyethylene, the polypropylene, the polyvinyl chloride, the polyvinylidene chloride, the polyvinyl alcohol (PVA), the fluorine based resin, the silicone rubber, the butadiene rubber, the thermoplastic elastomer, the epoxy resin and the silicone resin.

This makes it possible to improve dispersion stability of the ferrite powder in the resin composition and the moldability of the molded body more. Further, it is possible to more improve the toughness, the strength, the reliability and the like of the molded body.

Particularly, in the case where the particles constituting the ferrite powder are subjected to a surface treatment with a silane coupling agent, adhesion to various kinds of resins is improved, so that it is possible to more improve the dispersion stability of the ferrite powder in the resin composition and the moldability of the molded body further.

Further, the resin material contained in the resin composition may have a composition different from the resin material contained in the molded body produced using the resin composition. For example, the resin material contained in the resin composition may be a precursor (for example, a monomer, a dimer, a trimer, an oligomer, a prepolymer or the like) of the resin material contained in the finally obtained molded body.

A content rate of the resin material in the resin composition is not particularly limited, but is preferably 8.0 mass % or more and 95 mass % or less, and more preferably 10 mass % or more and 90 mass % or less.

This makes it possible to further improve the moldability of the molded body and to further improve the easiness of the detection and the stability of the detection of the molded body by the metal detector while enabling the toughness, the strength, the reliability and the like of the molded body to be further improved.

On the other hand, if the content rate of the resin material in the resin composition is less than the lower limit value noted above, there is a possibility that the moldability of the molded body decreases as well as the toughness, the strength, the reliability and the like of the molded body decrease.

Further, if the content rate of the resin material in the resin composition exceeds the upper limit value noted above, the content rate of the ferrite powder relatively decreases. Depending on the composition of the soft ferrite particles or the like, there is a possibility that the easiness of the detection and the stability of the detection of the molded body by the metal detector become insufficient.

The resin composition of the present invention may contain the ferrite powder and the resin material and may further contain a component (other component) other than them.

Examples of such a component (other component) include: various kinds of coloring agents such as pigments and dyes; various kinds of fluorescent materials; various kinds of light storing materials; various kinds of phosphorescent materials; a solvent; an infrared absorbing material; an ultraviolet absorbing material; a dispersant; a surfactant; a polymerization initiator; a polymerization accelerator; a crosslinking agent; a polymerization inhibitor; a sensitizer; a plasticizer; a slip agent (a leveling agent); a penetration accelerator; a wetting agent (a moisturizing agent); an antistatic agent; a fixing agent; an antiseptic agent; an antifungal agent; an antioxidant; a chelating agent; a pH adjusting agent; a thickening agent; a filler such as alumina, silica, titanium oxide, magnesium oxide, antimony oxide, calcium oxide, zinc oxide, aluminum hydroxide, magnesium hydroxide, calcium carbonate, potassium titanate, a glass fiber, a carbon fiber, a gypsum fiber, a metal fiber, metal particles, graphite, talc, clay, mica, wollastonite, xonotlite, hydrotalcite, zeolite and the like; an agglutination preventing agent; a defoamer; a foaming agent; and the like.

The resin composition of the present invention may be in any form. Examples of the form of the resin composition include a powder form, a pellet form, a dispersion liquid form, a slurry form, a gel form and the like. However, the pellet form is preferable.

This makes it possible to further improve the ease of handling of the resin composition and more suitably produce the molded body using the resin composition. Further, it is possible to further improve the storage stability of the resin composition, so that it is possible to more effectively prevent the constituent materials of the resin composition from being degraded at the time of storage.

In the case where the resin composition is in the pellet form, a volume average particle diameter thereof is preferably 1 mm or more and 10 mm or less, and more preferably 2 mm or more and 7 mm or less.

This makes it possible to further improve the ease of handling of the resin composition and more suitably produce the molded body using the resin composition.

The resin composition of the present invention can be produced, for example, by mixing the ferrite powder described above and the resin material. The mixing of the ferrite powder and the resin material can be carried out reliably by using a mixing device (kneading device) such as a stirring kneader such as a planetary mixer, a twin screw mixer, a kneader, a banbury mixer, an oven roll and the like, a single screw extruder, a twin screw extruder, and the like.

In addition, for example, the other component as described above may be further used at the time of mixing, if necessary.

<<Molded Body>>

Next, description will be made on the molded body of the present invention.

The molded body of the present invention has a portion formed using the resin composition of the present invention as described above.

This makes it possible to provide the molded body which can be stably detected by the metal detector.

Further, by including the ferrite powder as described above, it is possible to further improve the strength, durability and the like of the molded body, for example, when an external force such as tension or bending is applied, particularly even when a large external force is applied or when the external force is applied repeatedly, it is more effectively prevented that a part of the molded body is detached by cutting or the like. Therefore, it is possible to more effectively prevent the part of the molded body itself from being contaminated as the foreign matter in the product or the like.

The molded body of the present invention may have at least a portion formed by using the resin composition of the present invention and the whole thereof may be formed using the resin composition of the present invention. In addition to the portion formed using the resin composition of the present invention, it may have a portion constituted of a material other than the resin composition of the present invention.

More specifically, for example, the molded body may have a base portion constituted of the material other than the resin composition of the present invention and a surface layer formed on a surface of the base portion and formed using the resin composition of the present invention.

Further, the molded body of the present invention may be molded by, for example, mixing the resin composition of the present invention with another resin composition (a composition not containing the ferrite powder of the present invention).

It is preferable that the molded body includes the ferrite powder in at least the vicinity of its surface.

More specifically, the molded body preferably includes the ferrite powder in a region within 1.0 mm in a thickness direction from its surface, and more preferably includes the ferrite powder in a region within 0.5 mm in the thickness direction from the surface.

The vicinity of the surface of the molded body is a portion which is particularly easy to be detached in the molded body. Therefore, by including the ferrite powder in such a region, the effect of the present invention can be more remarkably exhibited.

In this regard, it is possible to reliably produce such a molded body, for example, by giving it a magnetic field from a direction to become the surface of the molded body at the time of forming the molded body (in a state that the resin material constituting the resin composition is softened or melted). In particular, in the case of the molded body having a relatively large thickness, the above-described ferrite can be unevenly distributed in the vicinity of the surface of the molded body, and the above-mentioned effect can be exhibited more remarkably.

The content rate of the ferrite powder in the molded body of the present invention varies depending on applications of the molded body, but it is preferably 2.0 mass % or more and 20 mass % or less, and more preferably 2.5 mass % or more and 18 mass % or less.

This makes it possible to further improve the easiness of the detection and the stability of the detection of the molded body by the metal detector, while enabling the toughness, the strength, the reliability and the like of the molded body to be improved.

In the case where the molded body has the portion not containing the ferrite powder (that is, the portion constituted of the material other than the resin composition of the present invention) in addition to the portion containing the ferrite powder (that is, the portion formed by using the resin composition of the present invention), it is preferable to meet the conditions concerning the content rate of the ferrite powder as described above in the portion containing the ferrite powder.

The molded body of the present invention may be used for any applications as long as there is a possibility that all or a part (for example, a section of the molded body) of the molded body is applied to the detection according to the metal detection, in other words, it is used as a purpose to be detected by the metal detector. Examples of the applications of the molded body of the present invention include: a field application for manufacturing, processing and packaging (including stowage, the same applies to the following) the food; a field application for manufacturing, processing and packaging cosmetics and quasi-drugs; a field application for manufacturing, processing and packaging pharmaceuticals; a field application for manufacturing, processing and packaging products other than the above; a field application for medical use; a field application for performing a biological treatment such as cell culture, tissue culture, organ culture, gene recombination and the like; a field application for performing a chemical treatment such as a compound synthesis and the like.

Among those, the molded body of the present invention is preferably used for the field application for manufacturing, processing and packaging the food.

The food is required to have high safety, but in general, the manufacturing, processing and packaging are carried out in an environment where the foreign matters are contaminated easily. Therefore, by applying the present invention to articles used in the field application for manufacturing, processing and packaging the food, the effect of the present invention can be more remarkably exhibited.

Further, many articles (for example, various kinds of cooking utensils, various kinds of containers, trays, wrapping films, and the like) applied to a microwave oven are included in the articles used in the field application for manufacturing and processing the food, but in the molded body of the present invention, since the ferrite which is a non-metal material is used, it can suitably be used for the microwave oven.

Further, in the case where the soft ferrite as described above is applied to the microwave oven by adjusting the composition or the like, it can generate heat (in particular, suitable heat generation to a predetermined temperature, which excessive temperature rise is prevented). Therefore, for example, it is possible to shorten cooking time, adjust a baking color of the food and the like suitably.

In this regard, in this specification, a form of the food includes a liquid state in addition to a solid state and a semi-solid state (a gel state such as a jelly, a pudding, etc.), and the food includes a drink and the like in the concept thereof. The food also includes a food additive and a supplement (health supplement) in the concept thereof. Furthermore, the food also includes artificial syntheses such as an artificial sweetener and an artificial seasoning, in addition to natural products such as animal derived meat, fish and shellfish, plant derived vegetables, fruits, seeds, cereals, legumes and seaweeds and processed products thereof in the concept of the food.

Examples of the molded body used in the field application for manufacturing and processing the food include: a cooking appliance; a cooking utensil; a food preparation tool; tableware; clothes (articles to be worn on a human body); a packaging member used for packaging the food; and articles to be used in association therewith; and articles used for maintenance, repair and the like of these; and the like.

More specifically, examples of the cooking appliance include: a hot plate, a stove, a gas burner, an oven, a toaster, a microwave oven, a dish washer, a dish dryer, a scale, a kitchen timer, a thermometer, a water purifier, a water purification filter (cartridge) and the like. Examples of the cooking utensil include: a pot, a frying pan, a kettle, these lids, a kitchen knife, scissors, a ladle, a spatula, a peeler, a slicer, a mixer, a chopper, a masher, a noodle rod, a muddler, a whisk, a bamboo basket, a bowl, a drainer, a chopping board, a mat, a rice paddle, a molding die, a clicker die, a foam removal, a grater (food grader), a fly return (turner), a pick, a sieve, a mill, a drop lid, an ice tray, a grill net, a tongue, an egg cutter, a measuring cup, a measuring spoon, and the like. Examples of the food preparation tool include: a dish towel, kitchen paper, washcloth, a towel, a paper towel, a draining sheet, a wrapping film, oven paper, a squeezing bag, a trivet, a pot stand, and the like. Examples of the tableware include: a dish, a cup, a bowl, chopsticks (including chopsticks for cooking), a spoon, a fork, a knife, a crab shellfish femoral walking leg extraction device (a crab spoon, a crab fork), and the like. Examples of the clothes (the articles to be worn on the human body) include: an apron, a white coat, a mask, a glove, shoes, socks, underwear, head gear, eyeglasses, and the like. Examples of the food packaging member include: a food packaging film such as a food laminating film, a packaging tube, a food storage bottle, a plastic sealing container and the like. Examples of others include: a net for dried fish, a hose, a cutting board stand, a dish stand, a sponge, a scrubber, a detergent container, a grinding stone, a sharpener, these constituent members and the like. However, they are not limited thereto.

In particular, the molded body of the present invention is preferably used for a part or all of the cooking utensil, the food preparation tool, or the food packaging member.

Thus, among various kinds of molded bodies, at least a part of such a molded body is likely to be contaminated in the food in the field for manufacturing, processing and packaging the food and the like, particularly. Therefore, when the present invention is applied to the molded body as described above, the effect of the present invention is more remarkably exhibited.

Further, in the case of applied to a medical field, for example, when misplacement of a medical instrument or a medical device in the body happens at the time of surgery, it can be easily detected, so that it is possible to more effectively prevent the serious medical malpractice cases from developing.

Various kinds of molding methods can be used as a method of producing the molded body. Examples thereof include: a molding method such as a injection molding method (a insert molding method, a multicolor molding method, a sandwich molding method, an injection molding method, etc.), an extrusion molding method, an inflation molding method, a T-die film molding method, a laminate molding method, a blow molding method, a hollow molding method, a compression molding method, a calendar molding method and the like; an optical molding method; a three-dimensional laminate molding method; and the like.

Further, in the case where the resin composition contains a curable resin, a curing reaction of the curable resin is performed. The curing reaction is performed differently depending on a kind of the curable resin and the like, but can be performed by heating, irradiating energy rays such as ultraviolet rays, or the like.

Further, at the time of producing the molded body, another material (for example, a resin material for dilution) in addition to the resin composition of the present invention may be used.

Further, at the time of producing the molded body, plural kinds of the resin composition of the present invention may be used in combination.

In the case where the molded body has the base portion formed using the material other than the resin composition described above and the surface layer provided on the base portion and formed using the resin composition of the present invention, the molded body may be produced by forming the surface layer using a coating method such as dipping and brush coating or the various kinds of printing methods such as an inkjet method on the base portion produced by the method as described above or a method such as casting, forging, a powder injection molding (PIM) and the like.

Further, it may be magnetized during the forming of the molded body. As a result, it is possible to further improve the easiness of the detection and the stability of the detection of the molded body by the metal detector.

Further, the molded body may be produced by subjecting to a post-treatment such as grinding or polishing with regard to the molded body obtained by the molding method as described above.

Although the preferred embodiments of the present invention have been described above, the present invention is not limited thereto.

For example, in the above-described embodiments, the case where the ferrite powder is dispersed in the resin material in the resin composition has been mainly described. However, in the resin composition of the present invention, for example, the ferrite powder is precipitated in the liquid and may be used after being dispersed by stirring as necessary. Further, for example, the resin composition of the present invention may be a dispersant body in which the ferrite powder and the resin particles are dispersed in a volatile liquid. Further, the resin composition of the present invention may have, for example, a configuration in which the ferrite powder and the resin powder are merely mixed.

EXAMPLES

Hereinafter, the present invention will be described in detail based on Examples and Comparative Examples, but the present invention is not limited thereto.

<<1>> Production of Ferrite Powder

Ferrite powder of each of the Examples and the Comparative Examples was produced as follows.

Example A1

First, $Fe_2O_3$ and $Mn_3O_4$ were prepared. These were put into a Henschel mixer at a molar ratio of 8.0:0.67, and then dry-mixed for 10 minutes. After that, the mixture was pelletized with a roller compactor. Thereafter, calcination was performed with a rotary kiln in an atmosphere at a sintering temperature (calcination temperature): 1000° C.

Next, using a dry media mill (vibrating mill, stainless steel beads each having a diameter of ⅛ inch), the calcined material was milled until a volume average particle diameter became about 4 μm. Then, water was added thereto and it was further milled using a wet type media mill (vertical bead mill, stainless steel beads each having a diameter of 1/16 inch) for 10 hours. Then, an aqueous solution of polyvinyl alcohol (PVA) as a binder was added thereto to obtain a slurry. A solid content in the slurry was 55.0 mass % and a content rate of the binder was 1.0 mass %.

Next, the obtained slurry was spray-dried with a spray dryer to obtain a granulated product.

Thereafter, a particle size of the obtained granulated product was adjusted. Further, it was heated in a rotary electric furnace at 650° C. for 2 hours to remove the binder.

Thereafter, using a fixed electric furnace, the obtained granulated product was sintered at 1280° C. for 4 hours (peak) in a nitrogen atmosphere, further deagglomerated and classified to obtain ferrite powder.

A content rate of Mn in the particles (soft ferrite particles) constituting the ferrite powder thus obtained was 7.88 mass % and a content rate of Fe was 64.13 mass %.

A content rate of each metal element (Fe, Mn, etc.) in the particles constituting the ferrite powder was determined as follows. That is, the ferrite particles: 0.2 g were weighed, a mixture obtained by adding 1 N hydrochloric acid: 20 ml and 1 N nitric acid: 20 ml to pure water: 60 ml was heated to prepare an aqueous solution in which the ferrite particles were completely dissolved. Then, the content rate of each metal element was determined by performing measurement using an ICP analysis device (manufactured by Shimadzu Corporation, ICPS-1000 IV). In each of the Examples and the Comparative Examples to be described later, a content rate was also obtained in the same manner.

Further, a volume average particle diameter of the particles constituting the ferrite powder was 45 μm.

The volume average particle diameter was determined by the following measurement. That is, first, the ferrite powder: 10 g as a sample and water: 80 ml were placed in a 100 ml beaker and 2 drops of a dispersant (sodium hexamethaphosphate) was added thereto. Next, dispersion was carried out using an ultrasonic homogenizer (UH-150 type manufactured by SMT. Co. LTD.). At this time, the output level of the ultrasonic homogenizer was set to 4 and the dispersion was carried out for 20 seconds. Thereafter, foam formed on a surface of the beaker was removed, and then it was introduced into a Microtrac particle size analyzer (for example, Model 9320-X100 manufactured by Nikkiso Co., Ltd.) to carry out the measurement. In each of the Examples and the Comparative Examples to be described later, a volume average particle diameter was also obtained in the same manner.

Further, the measurement of the ferrite powder using a vibration sample type magnetic measurement device was carried out. As a result, magnetization was 92 $A·m^2/kg$, residual magnetization was 6.2 $A·m^2/kg$, and coercive force was 1225 A/m.

The above magnetic properties were determined as follows. That is, first, a cell with an inner diameter of 5 mm and a height of 2 mm was filled with the ferrite powder and set in the vibration sample type magnetic measurement device (VSM-C7-10A manufactured by TOEI INDUSTRY Co., LTD.). Next, an applied magnetic field was applied, swept to 5 K·1000/4π·A/m, and then decreased to create a hysteresis curve. Thereafter, the magnetization, the residual magnetization and the coercive force were obtained from this curve data.

The ferrite powder was measured to obtain a Curie temperature and it was 450° C. The Curie temperature of the ferrite powder was determined by the measurement based on JIS C 2560-1.

In this regard, in each of the Examples and the Comparative Examples to be described later, a Curie temperature was also obtained in the same manner.

Examples A2 to A4

Ferrite powders were produced in the same manner as in the Example A1, except that the ratio of $Fe_2O_3$ and $Mn_3O_4$ used as the raw material was set as shown in Table 1 and the condition of the milling treatment with respect to the calcined material, the condition for spray drying by the spray dryer, and the condition for adjusting the particle size with respect to the granulated product were adjusted.

Example A5

First, $Fe_2O_3$, $Mn_3O_4$ and carbon black (C) were prepared, and then these were put into a Henschel mixer at a molar ratio of 8.0:0.67:1.1 and dry-mixed for 10 minutes to granulate.

Using a fixed electric furnace, the obtained granulated product was sintered at 1000° C. for 4 hours (peak) in a nitrogen atmosphere.

Further, the sintered product obtained by the above sintering was wet-milled with a bead mill under the condition of a solid content: 60 mass % for 30 minutes, washed, dehydrated and dried to obtain ferrite powder.

Comparative Examples A1, A2

Ferrite powders were produced in the same manner as in the Example A5, except that the amount of the raw material and the sintering temperature of the granulated product were set as shown in Table 1.

Comparative Example A3

Ferrite powder was produced in the same manner as in the Example A1, except that $Fe_2O_3$, NiO, ZnO and CuO were used as the raw material, the ratio thereof was set to 49.0:15.5:29.0:6.5 at a molar ratio, and the sintering of the granulated product was carried out at 1250° C. in the atmosphere.

The production conditions of the ferrite powder of each of the Examples and the Comparative Examples described above are shown as a whole in Table 1, and the properties and the like of the ferrite powder are shown as a whole in Table 2.

TABLE 1

| | Molar ratio of raw material | | | | | | Calcination conditions | | Slurry | | |
|---|---|---|---|---|---|---|---|---|---|---|---|
| | | | | | | | Calcination temperature [° C.] | Calcination atmosphere | Solid content [mass %] | Binder [mass %] | Gulenulation device |
| | Mn₃O₄ | Fe₂O₃ | NiO | ZnO | CuO | C | | | | | |
| Example A1 | 0.67 | 8.0 | 0 | 0 | 0 | 0 | 1000 | Atmosphere | 55.0 | 1.0 | Spray dryer |
| Example A2 | 0.67 | 8.0 | 0 | 0 | 0 | 0 | 1000 | Atmosphere | 55.0 | 1.0 | Spray dryer |
| Elample A3 | 0.33 | 9.0 | 0 | 0 | 0 | 0 | 1000 | Atmosphere | 55.0 | 1.0 | Spray dryer |
| Example A4 | 1.33 | 6.0 | 0 | 0 | 0 | 0 | 1000 | Atmosphere | 55.0 | 1.0 | Spray dryer |
| Example A5 | 0.67 | 8.0 | 0 | 0 | 0 | 1.1 | — | — | — | — | Henschel mixer |
| Comparative Example A1 | 0.33 | 1.0 | 0 | 0 | 0 | 0 | — | — | — | — | Henschel mixer |
| Comparative Example A2 | 0 | 6.0 | 0 | 0 | 0 | 1.1 | — | — | — | — | Henschel mixer |
| Comparative Example A3 | 0 | 49.0 | 15.5 | 29.0 | 6.5 | 0 | 1000 | Atmosphere | 55.0 | 1.0 | Spray dryer |

| | Binder removal conditions | | Sintering conditions | | Posttreatment | |
|---|---|---|---|---|---|---|
| | Treatment temperature [° C.] | Treatment atmosphere | Sintering temperature [° C.] | Sintering atmosphere | Milling | Classification |
| Example A1 | 650 | Atmosphere | 1280 | In nitrogen | — | Airflow classification |
| Example A2 | 650 | Atmosphere | 1280 | In nitrogen | — | Airflow classification |
| Elample A3 | 650 | Atmosphere | 1280 | In nitrogen | — | Airflow classification |
| Example A4 | 650 | Atmosphere | 1280 | In nitrogen | — | Airflow classification |
| Example A5 | — | — | 1000 | In nitrogen | Wet bead mill + Dry | — |
| Comparative Example A1 | — | — | 1280 | In nitrogen | Wet bead mill + Dry | — |
| Comparative Example A2 | — | — | 1000 | In nitrogen | Wet bead mill + Dry | — |
| Comparative Example A3 | 650 | Atmosphere | 1250 | In atmosphere | — | Airflow classification |

TABLE 2

| | Average particle size [μm] | Tint | Magnetic properties | | | | Content rate[mass %] | | | | |
|---|---|---|---|---|---|---|---|---|---|---|---|
| | | | Magnetization [A·m²/kg] | Residual magnetization [A·m²/kg] | Coercive force [A/m] | Curie Temperature [° C.] | Mn | Fe | Ni | Zn | Cu |
| Example A1 | 45 | Gunmetal gray | 92 | 6.2 | 1225 | 450 | 7.88 | 64.13 | 0 | 0 | 0 |
| Example A2 | 30 | Gunmetal gray | 93 | 6.5 | 1050 | 450 | 8.04 | 64.38 | 0 | 0 | 0 |
| Example A3 | 1.2 | Black | 88 | 34.2 | 5200 | 450 | 3.67 | 68.87 | 0 | 0 | 0 |
| Example A4 | 30 | Gunmetal gray | 95 | 26.2 | 1370 | 465 | 17.92 | 54.41 | 0 | 0 | 0 |
| Example A5 | 30 | Gunmetal gray | 87 | 5.5 | 660 | 435 | 7.93 | 64.25 | 0 | 0 | 0 |
| Comparative Example A1 | 1.2 | Black | 16 | 12.2 | 7970 | 450 | 23.56 | 48.36 | 0 | 0 | 0 |
| Comparative Example A2 | 0.8 | Black | 82 | 44.5 | 2690 | 480 | 0 | 69.26 | 0 | 0 | 0 |
| Comparative Example A3 | 30 | Gunmetal gray | 62 | 3.2 | 335 | 175 | 0 | 46.86 | 7.64 | 16.23 | 3.39 |

<<2>> Production of Resin Composition

Using the ferrite powder of each of the Examples and each of the Comparative Examples as described above, a resin composition was produced as follows.

Example B1

Using a kneader and a pelletizer, the ferrite powder produced in the Example A3 and polypropylene as a resin material were mixed at a mass ratio of 5.0:95.0, kneaded and granulated.

Thus, a resin composition as pellets having a volume average particle size of 3 mm was obtained.

Examples B2 to B5

Resin compositions as pellets were obtained in the same manner as in Example B1, except that the mixing ratio of the ferrite powder and the polypropylene was changed as shown in Table 3.

Example B6

Using a kneader and a pelletizer, the ferrite powder produced in the Example A3, polypropylene as a resin material and silica as a white pigment (AEROSIL 200 manufactured by NIPPON AEROSIL CO., LTD.) were mixed at a mass ratio of 2.0:93.0:5.0, kneaded and granulated.

Thus, a resin composition as pellets having a volume average particle size of 3 mm was obtained.

Examples B7 and B8

Resin compositions as pellets were obtained in the same manner as in the Example B6, except that the mixing ratio of the ferrite powder, the polypropylene and the silica was changed as shown in Table 3.

Examples B9 to B13

Resin compositions as pellets were obtained in the same manner as in Example B8, except that a kind of the resin material was changed as shown in Table 3.

Examples B14 to B17

Resin compositions as pellets were obtained in the same manner as in the Example B1, except that a kind of the ferrite powder and a kind of the resin material were changed as shown in Table 3 and a mixing amount of each component was changed as shown in Table 3.

Example B18

Using a ball mill, the ferrite powder produced in the Example A3, nylon resin powder and silica particles as a white pigment were mixed in the same mass ratio as that in the Example B12 to obtain a resin composition in a powder form.

Example B19

A resin composition in a powder form was obtained in the same manner as in Example B18, except that a kind of the resin material was changed as shown in Table 3.

Comparative Examples B1 to B3

Resin compositions as pellets were obtained in the same manner as in the Example B6, except that a kind of the ferrite powder was changed to the ferrite powders produced in the Comparative Examples A1 to A3, respectively, and a mixing amount of each component was changed.

Comparative Example B4

A resin composition as pellets was obtained in the same manner as in the Example B6, except that iron powder (average particle size: 60 μm) was used instead of the ferrite powder and a mixing amount of each component was changed.

The conditions of the resin composition of each of the Examples and the Comparative Examples described above are shown as a whole in Table 3. Further, in the column of the MFR in Table 3, a value of a melt flow rate (MFR) when measured under the conditions of a temperature: 190° C. and a load: 2.16 kg based on JIS K 7210 is shown.

TABLE 3

Table 3

| | Ferrite powder | | Resin material | | Coloring agent | | | | |
|---|---|---|---|---|---|---|---|---|---|
| | Kind | Content rate [mass %] | Kind | Content rate [mass %] | Kind | Content rate [mass %] | Molding method | Color of resin composition (pellets) | MFR [g/10 minutes] |
| Example B1 | Example A3 | 5.0 | Polypropylene | 95.0 | None | None | Kneader + Pelletizer | Black | 32.5 |
| Example B2 | Example A3 | 20.0 | Polypropylene | 80.0 | None | None | Kneader + Pelletizer | Black | 34.2 |
| Example B3 | Example A3 | 50.0 | Polypropylene | 50.0 | None | None | Kneader + Pelletizer | Black | 37.2 |
| Example B4 | Example A3 | 85.0 | Polypropylene | 15.0 | None | None | Kneader + Pelletizer | Black | 38.2 |
| Example B5 | Example A3 | 90.0 | Polypropylene | 10.0 | None | None | Kneader + Pelletizer | Black | Not flow |
| Example B6 | Example A3 | 2.0 | Polypropylene | 93.0 | $SiO_2$ | 5.0 | Kneader + Pelletizer | Light gray | 32.4 |
| Example B7 | Example A3 | 10.0 | Polypropylene | 85.0 | $SiO_2$ | 5.0 | Kneader + Pelletizer | Light gray | 33.0 |
| Example B8 | Example A3 | 20.0 | Polypropylene | 75.0 | $SiO_2$ | 5.0 | Kneader + Pelletizer | Light gray | 35.1 |
| Example B9 | Example A3 | 20.0 | Polyethylene | 75.0 | $SiO_2$ | 5.0 | Kneader + Pelletizer | Light gray | 3.65 |
| Example B10 | Example A3 | 20.0 | Polyvinyl chloride | 75.0 | $SiO_2$ | 5.0 | Kneader + Pelletizer | Light gray | 5.46 |
| Example B11 | Example A3 | 20.0 | Polyvinylidene chloride | 75.0 | $SiO_2$ | 5.0 | Kneader + Pelletizer | Light gray | 4.33 |
| Example B12 | Example A3 | 20.0 | Nylon | 75.0 | $SiO_2$ | 5.0 | Kneader + Pelletizer | Light gray | 8.11 |
| Example B13 | Example A3 | 20.0 | Fluorine based resin | 75.0 | $SiO_2$ | 5.0 | Kneader + Pelletizer | Light gray | 14.4 |
| Example B14 | Example A1 | 10.0 | Polyethylene | 90.0 | None | None | Kneader + Pelletizer | Gunmetal gray | 30.4 |
| Example B15 | Example A2 | 10.0 | Polyethylene | 90.0 | None | None | Kneader + Pelletizer | Gunmetal gray | 29.9 |
| Example B16 | Example A4 | 10.0 | Polyethylene | 90.0 | None | None | Kneader + Pelletizer | Gunmetal gray | 31.0 |

TABLE 3-continued

Table 3

| | Ferrite powder | | Resin material | | Coloring agent | | Molding method | Color of resin composition (pellets) | MFR [g/10 minutes] |
|---|---|---|---|---|---|---|---|---|---|
| | Kind | Content rate [mass %] | Kind | Content rate [mass %] | Kind | Content rate [mass %] | | | |
| Example B17 | Example A5 | 10.0 | Polyethylene | 90.0 | None | None | Kneader + Pelletizer | Gunmetal gray | 30.8 |
| Example B18 | Example A3 | 20.0 | Nylon | 75.0 | SiO$_2$ | 5.0 | Ball mill | Light gray | — |
| Example B19 | Example A3 | 20.0 | Fluorine based resin | 75.0 | SiO$_2$ | 5.0 | Ball mill | Light gray | — |
| Comparative Example B1 | Comparative Example A1 | 5.0 | Polypropylene | 90.0 | SiO$_2$ | 5.0 | Kneader + Pelletizer | Light gray | 32.5 |
| Comparative Example B2 | Comparative Example A2 | 5.0 | Polypropylene | 90.0 | SiO$_2$ | 5.0 | Kneader + Pelletizer | Light gray | 32.5 |
| Comparative Example B3 | Comparative Example A3 | 5.0 | Polypropylene | 90.0 | SiO$_2$ | 5.0 | Kneader + Pelletizer | Gunmetal gray | 30.9 |
| Comparative Example B4 | Iron powder | 5.0 | Polypropylene | 90.0 | SiO$_2$ | 5.0 | Kneader + Pelletizer | Gray | 27.1 |

<<3>> Production of Molded Body

Example C1

Using a kneader and a T-die, the resin composition (pellets) produced in the Example B1 was melted and molded to obtain a sheet-like molded body having a thickness: 100 μm.

Examples C2, C3

Sheet-like molded bodies were produced in the same manner as in the Example C1, except that the pellets produced in the Examples B2 and B3 were used as the resin composition instead of the pellets produced in the Example B1, respectively.

Example C4

Using a kneader, the resin composition (pellets) produced in the Example B4 was melted and injection-molded into a mold to obtain a plate-shaped molded body having a thickness: 2 mm.

Example C5

Using a kneader, the resin composition (pellets) produced in the Example B5 was melted and injection-molded into a mold to obtain a plate-shaped molded body having a thickness: 2 mm.

Examples C6 to C13

Sheet-like molded bodies were produced in the same manner as in the Example C1, except that the pellets produced in the Examples B6 to B13 were used as the resin composition instead of the pellets produced in the Example B1, respectively.

Example C14

The ferrite powder produced in the Example A3 and silica as a white pigment (AEROSIL 200 manufactured by NIPPON AEROSIL CO., LTD.) were dispersed in a PVA aqueous solution having a solid content of 10 mass %, and it was coated using an applicator and dried to obtain a sheet-like molded body having a thickness: 100 μm. At this time, the solid content of PVA, the ferrite powder and SiO$_2$ were adjusted so that each mass ratio became 75.0 mass %, 20.0 mass %, and 5.0 mass %, respectively.

Example C15

The ferrite powder produced in the Example A3, a liquid epoxy resin, a polymerization initiator, a boron trifluoride monoethylamine complex as a curing agent and silica as a white pigment (AEROSIL 200 manufactured by NIPPON AEROSIL CO., LTD.) were mixed, and then this mixture was poured into a mold made of a silicone resin. Thereafter, it was heated at 120° C. to cure the epoxy resin. Thus, a disk-shaped molded body having a diameter: 13 mm and a thickness: 2.0 mm was produced.

A content rate of the ferrite powder in the obtained molded body was 20.0 mass %, a content rate of the resin material was 75.0 mass %, and a content rate of the coloring agent was 5.0 mass %.

Example C16

The ferrite powder produced in the Example A3, an olefine-based thermoplastic elastomer and titanium dioxide particles as a white pigment were mixed, and this mixture was poured into a mold made of a silicone resin. Thereafter, it was heated at 120° C. to produce a disk-shaped molded body having a diameter: 13 mm and a thickness: 2.0 mm.

Examples C17, C18

Disk-shaped molded bodies were produced in the same manner as in the Example C16, except that a kind of the resin material was changed as shown in Table 5.

Example C19

The ferrite powder produced in the Example A3, a silicone resin and titanium dioxide particles as a white pigment were mixed so that a content rate of the ferrite powder was 20.0 mass %, a content rate of the resin material was 75.0 mass % and a content rate of the coloring agent (pigment) was 5.0 mass % in the molded body. This mixture was poured into a mold made of a silicone resin. At this time, the silicone resin was diluted with an organic solvent to a solid content of 20% by weight to use. It with the mold was heated at 65° C. to evaporate the organic solvent, and then heated to 120° C. Thus, the silicone resin was cured to produce a disk-shaped molded body having a diameter: 13 mm and a thickness: 2.0 mm.

Example C20

A disk-shaped molded body was produced in the same manner as in the Example C19, except that a kind of the resin material was changed as shown in Table 5.

Examples C21 to C24

Sheet-shaped molded bodies were produced in the same manner as in the Example C1, except that the pellets produced in each of Examples B14 to B17 were used as the resin composition instead of the pellets produced in Example B1.

Example C25

The resin composition (powder form) produced in the Example B18 was put into a mold and pressurized, and then it was taken out from the mold. It was heated at 180° C. for 4 hours to melt and cure. Thus, a disk-shaped molded body having a diameter: 13 mm and a thickness: 2.0 mm was produced.

Example C26

The resin composition (powder form) produced in the Example B19 was put into a mold and pressurized, and then it was taken out from the mold. It was heated at 180° C. for 4 hours to melt and cure. Thus, a disk-shaped molded body having a diameter: 13 mm and a thickness: 2.0 mm was produced.

Comparative Examples C1 to C4

Sheet-like molded bodies were produced in the same manner as in the Example C1, except that the pellets produced in the Comparative Examples B1 to B4 were used as the resin composition instead of the pellets produced in the Example B1, respectively.

The conditions of the molded body of each of the Examples and the Comparative Examples described above are shown as a whole in Table 4 and Table 5.

TABLE 4

| | Kind of resin composition used for production | Ferrite powder | | Resin material | | Coloring agent | | Molding method | Thickness [mm] | Tint |
|---|---|---|---|---|---|---|---|---|---|---|
| | | Kind | Content rate [mass %] | Kind | Content rate [mass %] | Kind | Content rate [mass %] | | | |
| Example C1 | Example B1 | Example A3 | 5.0 | Polypropylene | 95.0 | None | None | Kneader + T-die | 0.1 | Black |
| Example C2 | Example B2 | Example A3 | 20.0 | Polypropylene | 80.0 | None | None | Kneader + T-die | 0.1 | Black |
| Example C3 | Example B3 | Example A3 | 50.0 | Polypropylene | 50.0 | None | None | Kneader + T-die | 0.1 | Black |
| Example C4 | Example B4 | Example A3 | 85.0 | Polypropylene | 15.0 | None | None | Kneader + Spray to mold | 2.0 | Black |
| Example C5 | Example B5 | Example A3 | 90.0 | Polypropylene | 10.0 | None | None | Kneader + Spray to mold | 2.0 | Black |
| Example C6 | Example B6 | Example A3 | 2.0 | Polypropylene | 93.0 | $SiO_2$ | 5.0 | Kneader + T-die | 0.1 | Light gray |
| Example C7 | Example B7 | Example A3 | 10.0 | Polypropylene | 85.0 | $SiO_2$ | 5.0 | Kneader + T-die | 0.1 | Light gray |
| Example C8 | Example B8 | Example A3 | 20.0 | Polypropylene | 75.0 | $SiO_2$ | 5.0 | Kneader + T-die | 0.1 | Light gray |
| Example C9 | Example B9 | Example A3 | 20.0 | Polyethylene | 75.0 | $SiO_2$ | 5.0 | Kneader + T-die | 0.1 | Light gray |
| Example C10 | Example B10 | Example A3 | 20.0 | Polyvinyl chloride | 75.0 | $SiO_2$ | 5.0 | Kneader + T-die | 0.1 | Light gray |
| Example C11 | Example B11 | Example A3 | 20.0 | Polyvinylidene chloride | 75.0 | $SiO_2$ | 5.0 | Kneader + T-die | 0.1 | Light gray |
| Example C12 | Example B12 | Example A3 | 20.0 | Nylon | 75.0 | $SiO_2$ | 5.0 | Kneader + T-die | 0.1 | Light gray |
| Example C13 | Example B13 | Example A3 | 20.0 | Fluorine based resin | 75.0 | $SiO_2$ | 5.0 | Kneader + T-die | 0.1 | Light gray |

TABLE 5

| | Kind of resin composition used for production | Ferrite powder | | Resin material | | Coloring agent | | Molding method | Thickness [mm] | Tint |
|---|---|---|---|---|---|---|---|---|---|---|
| | | Kind | Content rate [mass %] | Kind | Content rate [mass %] | Kind | Content rate [mass %] | | | |
| Example C14 | — | Example A3 | 20.0 | Polyvinyl alcohol | 75.0 | $SiO_2$ | 5.0 | Applicator | 0.1 | Light gray |

TABLE 5-continued

Table 5

| | Kind of resin composition used for production | Constituent materials | | | | | | Molding method | Thickness [mm] | Tint |
|---|---|---|---|---|---|---|---|---|---|---|
| | | Ferrite powder | | Resin material | | Coloring agent | | | | |
| | | Kind | Content rate [mass %] | Kind | Content rate [mass %] | Kind | Content rate [mass %] | | | |
| Example C15 | — | Example A3 | 20.0 | Epoxy resin | 75.0 | SiO$_2$ | 5.0 | Pouring into mold | 2.0 | Gray |
| Example C16 | — | Example A3 | 20.0 | Thermoplastic elastomer | 75.0 | TiO$_2$ | 5.0 | Pouring into mold | 2.0 | Gray |
| Example C17 | — | Example A3 | 20.0 | Silicone rubber | 75.0 | TiO$_2$ | 5.0 | Pouring into mold | 2.0 | Gray |
| Example C18 | — | Example A3 | 20.0 | Butadiene rubber | 75.0 | TiO$_2$ | 5.0 | Pouring into mold | 2.0 | Gray |
| Example C19 | — | Example A3 | 20.0 | Silicone resin | 75.0 | TiO$_2$ | 5.0 | Pouring into mold | 2.0 | Gray |
| Example C20 | — | Example A3 | 20.0 | Acrylic resin | 75.0 | TiO$_2$ | 5.0 | Pouring into mold | 2.0 | Gray |
| Example C21 | Example B14 | Example A1 | 10.0 | Polyethylene | 90.0 | None | None | Kneader + T-die | 0.1 | Gunmetal gray |
| Example C22 | Example B15 | Example A2 | 10.0 | Polyethylene | 90.0 | None | None | Kneader + T-die | 0.1 | Gunmetal gray |
| Example C23 | Example B16 | Example A4 | 10.0 | Polyethylene | 90.0 | None | None | Kneader + T-die | 0.1 | Gunmetal gray |
| Example C24 | Example B17 | Example A5 | 10.0 | Polyethylene | 90.0 | None | None | Kneader + T-die | 0.1 | Gunmetal gray |
| Example C25 | Example B18 | Example A3 | 20.0 | Nylon | 75.0 | SiO$_2$ | 5.0 | Pressure forming | 2.0 | Light gray |
| Example C26 | Example B19 | Example A3 | 20.0 | Fluorine based resin | 75.0 | SiO$_2$ | 5.0 | Pressure forming | 2.0 | Light gray |
| Comparative Example C1 | Comparative Example B1 | Comparative Example A1 | 5.0 | Polypropylene | 90.0 | SiO$_2$ | 5.0 | Kneader + T-die | 0.1 | Light gray |
| Comparative Example C2 | Comparative Example B2 | Comparative Example A2 | 5.0 | Polypropylene | 90.0 | SiO$_2$ | 5.0 | Kneader + T-die | 0.1 | Light gray |
| Comparative Example C3 | Comparative Example B3 | Comparative Example A3 | 5.0 | Polypropylene | 90.0 | SiO$_2$ | 5.0 | Kneader + T-die | 0.1 | Gunmetal gray |
| Comparative Example C4 | Comparative Example B4 | Iron powder | 5.0 | Polypropylene | 90.0 | SiO$_2$ | 5.0 | Kneader + T-die | 0.1 | Gray |

<<4>> Evaluation of Molded Body

<<4-1>> Detection by Metal Detector

The molded body produced in each of the Examples and the Comparative Examples described above was allowed to pass through a belt conveyor type metal detector (META-HAWKII, manufactured by System Square Inc.) and sensitivity (level meter, iron ball sensitivity) which was capable of detecting the molded body was determined.

<<4-2>> Heating at the Time of Irradiating with Microwaves

The molded body produced in each of the Examples and the Comparative Examples described above was heated at 600 W for 5 minutes using a commercially available microwave oven. The state of each molded body at this time was evaluated according to the following criteria.

○: A Temperature rise (30° C. or more and 100° C. or less) was observed within an appropriate range.

Δ: The temperature rise was insufficient (20° C. or more and less than 30° C.).

X: Abnormal heating of the molded body was observed and burning of the molded body was confirmed. Or abnormality such as occurrence of spark in the microwave oven was observed and evaluation was stopped. Or, it was hardly heated (less than 20° C.).

In each of the Examples C1 to C14 and C21 to C24 and each of the Comparative Examples C1 to C4 in which the molded body was molded into the sheet shape, the molded body was cut into a size of 80 mm×60 mm, and then the cut molded body was evaluated. In each of the Examples C15 to C20, C25 and C26, the obtained molded body was used for the evaluation as it was.

These results are shown in Table 6.

TABLE 6

Table 6

| | Level meter | Iron ball sensitivity | Heating test by microwave oven (heating at 600 W for 5 minutes) |
|---|---|---|---|
| Example C1 | 7 | Fe φ 0.6 | Δ |
| Example C2 | 22 | Fe φ 1.0 | Δ |
| Example C3 | 52 | Fe φ 1.1 | Δ |
| Example C4 | 87 | Fe φ 1.2 | Δ |
| Example C5 | 92 | Fe φ 1.3 | Δ |
| Example C6 | 4 | Fe φ 0.5 | Δ |
| Example C7 | 12 | Fe φ 0.7 | Δ |
| Example C8 | 26 | Fe φ 1.0 | Δ |
| Example C9 | 24 | Fe φ 1.0 | Δ |
| Example C10 | 22 | Fe φ 1.0 | Δ |
| Example C11 | 23 | Fe φ 1.0 | Δ |
| Example C12 | 23 | Fe φ 1.0 | Δ |
| Example C13 | 25 | Fe φ 1.0 | Δ |
| Example C14 | 24 | Fe φ 1.0 | Δ |
| Example C15 | 110 | Fe φ 1.6 | Δ |
| Example C16 | 117 | Fe φ 1.6 | Δ |
| Example C17 | 115 | Fe φ 1.6 | Δ |
| Example C18 | 116 | Fe φ 1.6 | Δ |
| Example C19 | 119 | Fe φ 1.6 | Δ |
| Example C20 | 113 | Fe φ 1.6 | Δ |
| Example C21 | 520 | Fe φ 2.5 or more | ○ |
| Example C22 | 550 | Fe φ 2.5 or more | ○ |
| Example C23 | 530 | Fe φ 2.5 or more | ○ |
| Example C24 | 540 | Fe φ 2.5 or more | ○ |
| Example C25 | 23 | Fe φ 1.0 | Δ |
| Example C26 | 25 | Fe φ 1.0 | Δ |

TABLE 6-continued

Table 6

| | Level meter | Iron ball sensitivity | Heating test by microwave oven (heating at 600 W for 5 minutes) |
|---|---|---|---|
| Comparative Example C1 | <5 | Not detectable | Δ |
| Comparative Example C2 | 7 | Fe φ 0.8 | X (Part of molded body too much heated and burned.) |
| Comparative Example C3 | 7 | Fe φ 0.8 | X |
| Comparative Example C4 | 320 | Fe φ 2.0~2.2 correspond | X (Spark occurred during heating and evaluation was stopped.) |

As is apparent from Table 6, in the present invention, the molded body which can be stably detected by the metal detector could be obtained. Further, in the present invention, it was possible to preferably control the surface property of the molded body, and effectively prevent unintentional roughness from generating due to inclusion of the powder. Further, in the present invention, the molded body could be adjusted to various colors by the coloring agent. In contrast, satisfactory results were not obtained in the comparative examples.

INDUSTRIAL APPLICABILITY

The ferrite powder of the present invention is ferrite powder detectable with a metal detector, comprising: soft ferrite particles containing Mn of 3.5 mass % or more and 20.0 mass % or less and Fe of 50.0 mass % or more and 70.0 mass % or less. Therefore, it is possible to provide the ferrite powder which can suitably use for producing the molded body which can be stably detected with the metal detector. Therefore, the ferrite powder of the present invention has industrial applicability.

What is claimed is:

1. Ferrite powder detectable with a metal detector, comprising:
   soft ferrite particles containing Mn of 3.5 mass % or more and 20.0 mass % or less and Fe of 50.0 mass % or more and 70.0 mass % or less,
   wherein coercive force of the soft ferrite particles by a VSM measurement when a magnetic field of 5 k·1000/4π A/m is applied is 550 A/m or more and 6500 A/m or less.

2. The ferrite powder according to claim 1, wherein a volume average particle diameter of the particles constituting the ferrite powder is 0.1 μm or more and 100 μm or less.

3. The ferrite powder according to claim 1, wherein magnetization by the VSM measurement when the magnetic field of 5 k·1000/4π A/m is applied is 85 A·m$^2$/kg or more and 98 A·m$^2$/kg or less.

4. A resin composition, comprising:
   the ferrite powder according to claim 1; and
   a resin material.

5. The resin composition according to claim 4, wherein the ferrite powder is dispersedly present in the resin material.

6. The resin composition according to claim 4, wherein a content rate of the ferrite powder in the resin composition is 5.0 mass % or more and 90 mass % or less.

7. The resin composition according to claim 4, wherein the resin material includes one kind or more kinds selected from the group consisting of polyethylene, polypropylene, polyvinyl chloride, polyvinylidene chloride, polyvinyl alcohol (PVA), a fluorine based resin, silicone rubber, butadiene rubber, a thermoplastic elastomer, an epoxy resin and a silicone resin.

8. A molded body having a portion formed by using the resin composition according to claim 4.

9. The molded body according to claim 8, wherein a content rate of the ferrite powder is 2.0 mass % or more and 20 mass % or less.

10. The molded body according to claim 8, wherein the molded body is used in a field for manufacturing, processing and packaging of a food.

11. The molded body according to claim 10, wherein the molded body is used for a part or all of a cooking utensil, a food preparation tool or a food packaging member.

12. The molded body according to claim 8, wherein the molded body contains the ferrite powder in a region within 1.0 mm in a thickness direction from a surface thereof.

* * * * *